United States Patent
Kuwajima

(10) Patent No.: US 9,193,217 B2
(45) Date of Patent: *Nov. 24, 2015

(54) PNEUMATIC TIRE

(75) Inventor: Masatoshi Kuwajima, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 618 days.

This patent is subject to a terminal disclaimer.

(21) Appl. No.: 13/321,165

(22) PCT Filed: May 26, 2010

(86) PCT No.: PCT/JP2010/058907
§ 371 (c)(1),
(2), (4) Date: Nov. 17, 2011

(87) PCT Pub. No.: WO2010/137617
PCT Pub. Date: Dec. 2, 2010

(65) Prior Publication Data
US 2012/0060989 A1    Mar. 15, 2012

(30) Foreign Application Priority Data

May 27, 2009 (JP) ................... 2009-127569

(51) Int. Cl.
*B60C 11/12* (2006.01)

(52) U.S. Cl.
CPC ............. *B60C 11/12* (2013.01); *B60C 11/1218* (2013.04); *B60C 11/1222* (2013.04);
(Continued)

(58) Field of Classification Search
CPC ............ B60C 11/1218; B60C 11/1222; B60C 11/1204; B60C 11/1272; B60C 11/1281; B60C 11/1236; B60C 11/1259; B60C 11/1263; B60C 11/12; B60C 2011/1213; B60C 2011/1254; B60C 2011/1227
USPC .............. 152/DIG. 3, 209.17, 209.23, 209.18
IPC ...................................................... B60C 11/12
See application file for complete search history.

(56) References Cited

U.S. PATENT DOCUMENTS

| | | | | |
|---|---|---|---|---|
| 6,003,575 A | * | 12/1999 | Koyama et al. | .......... 152/209.18 |
| 6,523,586 B1 | * | 2/2003 | Eromäki et al. | ........... 152/154.2 |
| 2008/0041510 A1 | * | 2/2008 | Suganuma | ............... 152/209.18 |

FOREIGN PATENT DOCUMENTS

| | | |
|---|---|---|
| EP | 0131246 | 1/1985 |
| EP | 0847878 | 6/1998 |

(Continued)

OTHER PUBLICATIONS

Machine translation of JP06-002443B, 1994.*
(Continued)

*Primary Examiner* — Justin Fischer
*Assistant Examiner* — Philip N Schwartz
(74) *Attorney, Agent, or Firm* — Thorpe North & Western, LLC

(57) ABSTRACT

A pneumatic tire including a closed sipe 5 formed in a tread surface 1 that includes a small hole 2 extending along a tire radial direction and a plurality of cuts 4 extending in a radiation direction from the small hole 2 and that terminating in a land portion 3. A diameter of an inscribed circle of the small hole 2 is greater than a thickness of the cuts 4. The cuts 4 are provided with a twist in a depth direction centered on the small hole 2, and a twist angle θ from a top surface to a bottom surface of the land portion 3 is not less than 10° and less than 135°.

20 Claims, 9 Drawing Sheets

(52) U.S. Cl.
CPC ..... *B60C11/1272* (2013.04); *B60C 2011/1213* (2013.04); *B60C 2011/1227* (2013.04); *B60C 2011/1254* (2013.04)

(56) References Cited

FOREIGN PATENT DOCUMENTS

| EP | 0963864 | | | 12/1999 | |
|---|---|---|---|---|---|
| JP | 64-047603 | | | 2/1989 | |
| JP | 01047603 | A | * | 2/1989 | ............. B60C 11/11 |
| JP | 06002443 | B | * | 1/1994 | ............. B60C 11/11 |
| JP | 08118918 | A | * | 5/1996 | ............. B60C 11/11 |
| JP | 08-197914 | | | 8/1997 | |
| JP | 09-263111 | | | 10/1997 | |
| JP | 10-138715 | | | 5/1998 | |
| JP | 2002-029226 | | | 1/2002 | |
| JP | 2006-027306 | | | 2/2006 | |
| JP | 2006027306 | A | * | 2/2006 | ............. B60C 11/12 |
| JP | 2008-308093 | | | 12/2008 | |

OTHER PUBLICATIONS

Machine translation of JP08-118918, 1996.*
Machine translation of JP2006-027306, 2006.*
PCT Application PCT/JP2010/058907; filing date May 26, 2010; Masatoshi Kuwajima; ISR mailed Jul. 20, 2011.
European Search Report, Dec. 20, 2012, 5 pages, Germany.

* cited by examiner

|  |  | Comparative Example 1 | Working Example 1 | Working Example 2 | Working Example 3 | Working Example 4 | Working Example 5 |
|---|---|---|---|---|---|---|---|
| Closed sipe 5 | Presence or absence of small hole 2 | Present | Present | Present | Present | Present | Present |
|  | Number of cuts 4 | 3 | 2 | 7 | 3 | 2 | 2 |
|  | Twist angle θ of cuts 4 (°) | 0 | 10 | 130 | 90 | 90 | 90 |
|  | Thickness w of cuts 4 (mm) | 0.5 | 0.5 | 0.1 | 0.5 | 0.5 | 0.5 |
|  | Diameter d of inscribed circle of small hole 2 (mm) | 1.5 | 0.5 | 2.1 | 0.5 | 1.5 | 0.5 |
|  | d/w | 3.0 | 1.0 | 21.0 | 1.0 | 3.0 | 1.0 |
|  | Presence or absence of combined disposal with width direction sipe | Present | Absent | Absent | Absent | Absent | Present |
|  | Presence or absence of disposal on leading edge and trailing edge | Present | Absent | Absent | Absent | Absent | Absent |
| Evaluation Results | Braking performance on ice | 100 | 102 | 104 | 103 | 103 | 103 |
|  | Releaseability from mold | ○ | ○ | ○ | ○ | ○ | ○ |

FIG. 7A

|  |  | Working Example 6 | Working Example 7 | Working Example 8 | Comparative Example 2 | Comparative Example 3 | Comparative Example 4 |
|---|---|---|---|---|---|---|---|
| Closed sipe 5 | Presence or absence of small hole 2 | Present | Present | Present | Present | Absent | Absent |
|  | Number of cuts 4 | 3 | 3 | 3 | 3 | 3 | 3 |
|  | Twist angle θ of cuts 4 (°) | 90 | 105 | 120 | 135 | 105 | 135 |
|  | Thickness w of cuts 4 (mm) | 0.5 | 0.5 | 0.5 | 0.5 | 0.5 | 0.5 |
|  | Diameter d of inscribed circle of small hole 2 (mm) | 1.5 | 1.5 | 1.5 | 1.5 | - | - |
|  | d/w | 3.0 | 3.0 | 3.0 | 3.0 | - | - |
|  | Presence or absence of combined disposal with width direction sipe | Present | Present | Present | Present | Present | Present |
|  | Presence or absence of disposal on leading edge and trailing edge | Present | Present | Present | Present | Present | Present |
| Evaluation Results | Braking performance on ice | 105 | 107 | 108 | 108 | 100 | 102 |
|  | Releaseability from mold | ○ | ○ | ○ | × | ○ | × |

FIG. 7B

PNEUMATIC TIRE

TECHNICAL FIELD

The present technology relates to a pneumatic tire, and particularly relates to a pneumatic tire configured so that braking performance when traveling on icy road surfaces is enhanced without hindering the steering stability of a tire having sipes formed in a tread surface thereof.

BACKGROUND ART

Sipes are commonly provided in a tread surface in order to enhance water absorption in order to enhance traveling performance on wet road surfaces and icy and snowy road surfaces. However, if an excessive number of sipes are disposed in the tread surface, the tread rigidity will decline, leading to steering stability and braking ability being negatively affected. Therefore, conventionally, various technologies have been proposed regarding the form and arrangement of the sipe (e.g. see Japanese Unexamined Patent Application No. H9-263111A and Japanese Unexamined Patent Application Publication No. 2006-27306A).

Of these, Japanese Unexamined Patent Application No. H9-263111A describes enhancing steering stability on ice while preventing damage such as the sipes cracking or chunks being taken out of the tire by disposing two or more sipes in a block face that extend in mutually differing directions so as to cross. Additionally, Japanese Unexamined Patent Application Publication No. 2006-27306A describes enhancing riding comfort while ensuring steering stability and wet braking performance by providing a sipe with a shape having a twist around a twisting axis that extends in a tire radial direction.

However, in the case of Japanese Unexamined Patent Application No. H9-263111A, while the water absorption of the tread surface is enhanced to a certain degree, there is a limitation in that it becomes difficult to maintain steering stability if further enhancements of the water absorption are attempted. Additionally, in the case of Japanese Unexamined Patent Application Publication No. 2006-27306A, due to the twist angle being set to a size reaching 135° and greater, there are problems such as releasability from a mold after the tire is vulcanization molded being negatively affected and the tread surface becoming easily damageable.

SUMMARY TECHNOLOGY

The present technology provides a pneumatic tire configured so that water absorption can be enhanced while suppressing a decline in tread rigidity in a tire having a sipe formed in a tread surface; braking performance on ice can be enhanced while maintaining steering stability performance; and releasability from a mold is not hindered.

The pneumatic tire of the present technology includes a closed sipe that is formed in a tread surface and includes a small hole extending in a tire radial direction and a plurality of cuts extending in a radiation direction from the small hole and terminating in a land portion. A diameter of an inscribed circle of the small hole is greater than a thickness of the cuts. The cuts are provided with a twist in a depth direction centered on the small hole, and a twist angle from a top surface to a bottom surface of the land portion is not less than 10° and less than 135°.

Furthermore, the configuration described above is preferably configured as described in (1) to (3) below.

(1) From 3 to 6 of the cuts are provided.

(2) The diameter of the inscribed circle of the small hole is configured so as to be from 1.5 to 20 times the thickness of the cuts.

(3) The closed sipe is disposed in the tread surface in combination with a sipe extending in a tire width direction. In this case, the closed sipe is preferably disposed along the tire width direction on a leading edge side and/or a trailing edge side of a block formed in the tread surface.

According to the present technology described above, a closed sipe is provided in a tread surface that is centered on a small hole extending in a tire radial direction, and has a plurality of cuts extending in a radiation direction from the small hole and that terminate in a land portion. The cuts are provided with a twist in a depth direction centered on the small hole, and a twist angle from a top surface to a bottom surface of the land portion is not less than 10° and less than 135°. Therefore, water absorption can be enhanced due to an increase in the cubic capacity of the closed sipe while suppressing a decline in tread rigidity without hindering releasability from a mold; and braking performance on ice can be enhanced while maintaining steering stability when traveling on dry and wet road surfaces.

Moreover, because the diameter of the inscribed circle of the small hole located in a center portion of the closed sipe is configured so as to be greater than the thickness of the cuts, the flow of water into the small hole when traveling on icy road surfaces is facilitated, and the water that flows into the small hole can be efficiently dispersed toward each of the cuts. This leads to rapid and efficient water absorption.

BRIEF DESCRIPTION OF THE DRAWINGS

FIGS. 7A and 7B include Table 1 which details results of braking performance on ice and releasability from a mold for comparative and working examples.

DETAILED DESCRIPTION

Figure 1:
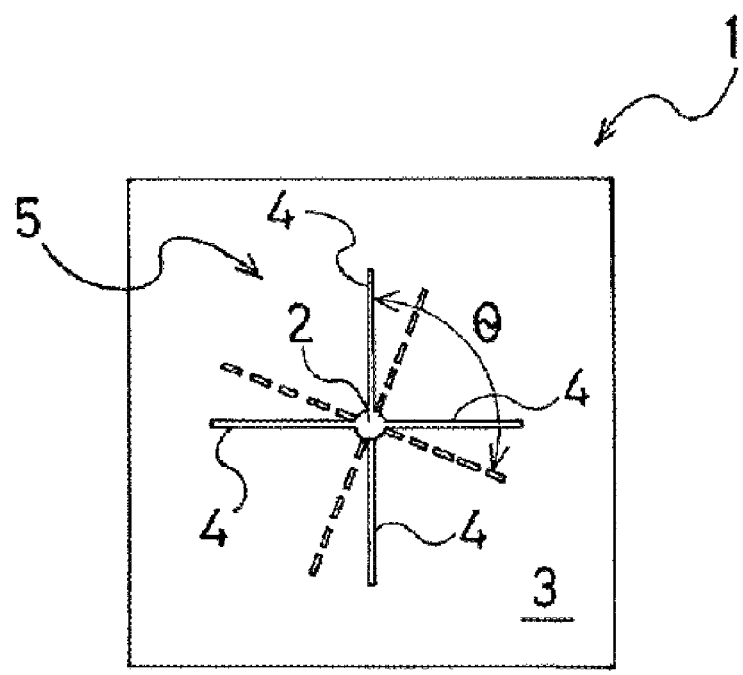
FIG. 1 is a plan view illustrating an example of a closed sipe formed in a tread surface of a pneumatic tire according to an embodiment of the present technology.
Figure 2:
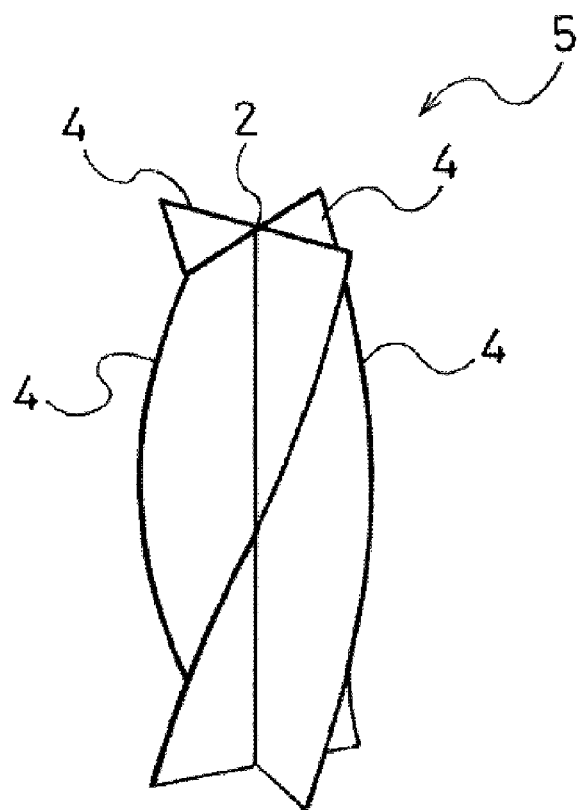
FIG. 2 is a perspective view illustrating an outer wall shape of the closed sipe of FIG. 1.

Detailed descriptions will be given below of a configuration of the present technology with reference to the accompanying drawings. FIG. 1 is a partial plan view illustrating an example of a closed sipe formed in a tread surface of a pneumatic tire according to an embodiment of the present technology in a box-shaped frame. FIG. 2 is a perspective view illustrating an outer wall shape of the closed sipe of FIG. 1 in FIGS. 7A and 7B.

In FIG. 1, a closed sipe 5 (see FIG. 2) is formed in a tread surface 1 from a small hole 2 extending in a tire radial direction, and a plurality of cuts 4 (four cuts in the drawing) extending in a radiation direction from the small hole 2 and that terminate in a land portion 3. The cuts 4 are each provided with a twist in a depth direction centered on the small hole 2, and a twist angle θ from a top surface to a bottom surface of the land portion 3 is not less than 10° and less than 135° and preferably from 90° to 120°. In the drawings, the dotted lines represent the bottom surfaces of the cuts 4. Note that in the closed sipe 5 of the present technology, as described hereinafter, a diameter of an inscribed circle of the small hole 2 is formed so as to be greater than a thickness of the cuts 4.

As a result, water absorption can be enhanced by increasing a cubic capacity of the closed sipe 5 while declines in tread rigidity can be suppressed, without hindering releasability from a mold. Thus, braking performance on ice can be enhanced while maintaining steering stability when traveling on dry and wet road surfaces.

Moreover, because the diameter of the inscribed circle of the small hole 2 located in a center portion of the closed sipe 5 is configured so as to be greater than the thickness of the cuts 4, the flow of water into the small hole 2 when traveling on icy road surfaces is facilitated, and the water that flows into the small hole 2 can be efficiently dispersed toward each of the cuts 4. This leads to rapid and efficient water absorption.

If the twist angle θ is less than 10°, water absorption will not be sufficiently enhanced and braking performance on ice will not be sufficiently enhanced. If the twist angle θ is 135° or greater, releasability when removing the tire from a mold after vulcanization will be negatively affected and the tread surface 1 will become easily damageable.

Note that in the present technology, the twist angle θ of the cuts 4 need not be the same in each of the cuts 4 that form the closed sipe 5. In other words, cases in which spacing varies between mutually adjacent cuts 4 in a single closed sipe 5 are allowable. Additionally, in addition to being configured so as to vary uniformly (linearly) with respect to the depth direction, the twist angle θ of the cuts 4 may also be configured so as to vary nonlinearly.

With the pneumatic tire of the present technology configured as described above, the form of the closed sipe 5 includes a plurality of the cuts 4 that are provided with a twist around the small hole 2 that extends in the tire radial direction. Therefore, when removing the tire from the mold after vulcanization, the tread surface 1 becomes easily damageable by the molding blades of the cuts 4. From this perspective, freely rotating molding blades of the cuts 4 centered on a molding axis of the small hole 2 are preferably provided on an inner surface of the mold used for vulcanization molding the pneumatic tire of the present technology, and vulcanization molding is preferably performed using this mold.

In the embodiments illustrated in FIG. 1 and FIG. 2, examples where four of the cuts 4 that form the closed sipe 5 are provided are illustrated, but the number of the cuts 4 on the present technology is not limited thereto, and preferably from 3 to 6 of the cuts 4 are provided. If the number of the cuts 4 is two or less, it will become difficult to obtain excellent braking performance on ice. If the number is seven or greater, there will be a risk of cracking in the tread surface 1 during traveling of the tire.

Figure 3A:
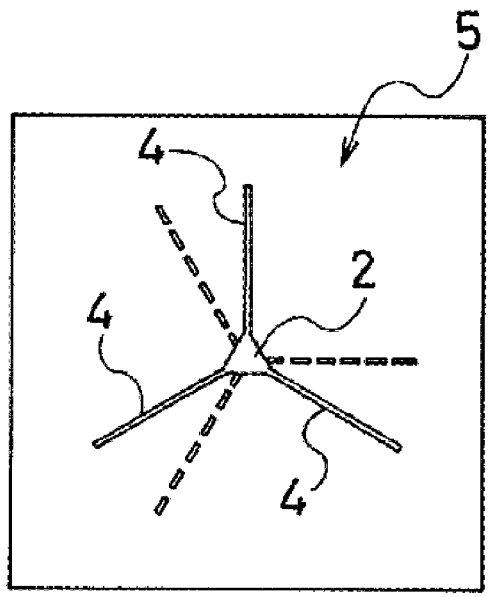
FIGS. 3A and 3B are each plan views, corresponding to FIG. 1, of other embodiments of the present technology.
Figure 3B:
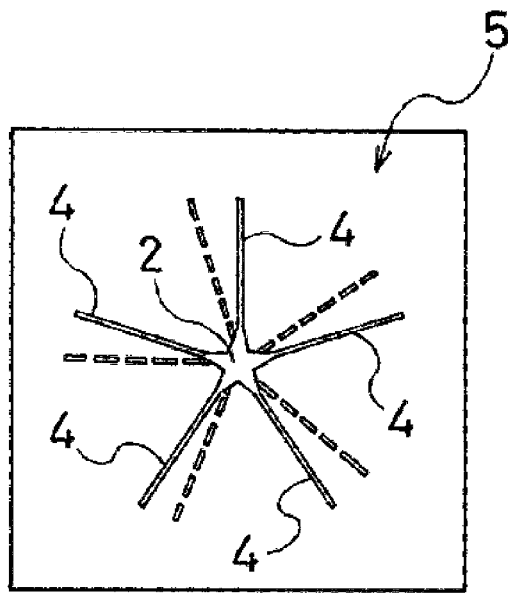

Additionally, a cross-sectional shape of the small hole 2 positioned in the center portion of the closed sipe 5 is not particularly limited but, as illustrated in FIG. 1, can be configured to have a substantially round shape or a rectangular shape. Alternately, as illustrated in FIGS. 3A and 3B, depending on the number of the cuts 4 that form the closed sipe 5, the cross-sectional shape of the small hole 2 can be configured so as to form a polygonal or star shape that corresponds to the number of the cuts 4.

Figure 3C:
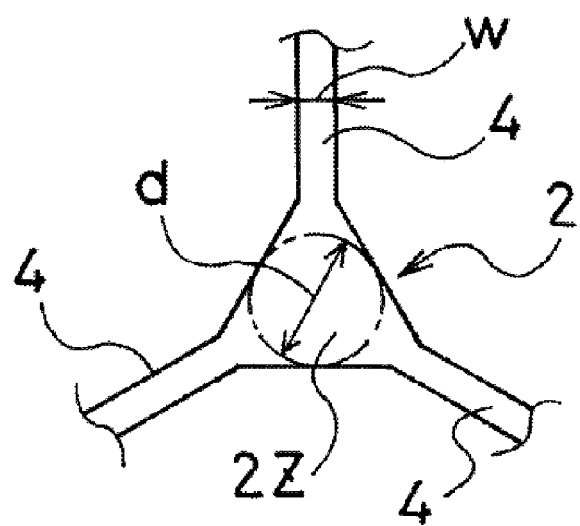
FIG. 3C is a partial enlarged view illustrating the size of the small hole of FIG. 3A.

As illustrated in FIG. 3C, with the closed sipe 5 of the present technology, a diameter d of an inscribed circle 2z of the small hole 2 is configured so as to be a size from 1.5 to 20 times, and preferably from 1.5 to 5 times of a thickness w of the cuts 4. As a result, water absorption when traveling on icy road surfaces can be enhanced while declines in tread rigidity can be suppressed, and braking ability on ice can be reliably enhanced.

Note that the thickness w of the cuts 4 is not particularly limited, but is preferably set to from about 0.5 to 2 mm. Furthermore, a depth of the closed sipe 5 is not particularly limited, but when the tire is provided with a platform which acts as an indication of specification limits as a winter tire, the depth is preferably set so as to reach a top surface of the platform. As a result, after use as a winter tire is finished, it will be possible to use the tire as a summer tire.

In the embodiment described above, an example is described in which the cuts 4 extend in a linear form in the radiation direction from the small hole 2. However, the closed sipe 5 of the present technology can be formed so that a planar shape of the cuts 4 extend in a wavelike or zigzag manner in the radiation direction from the small hole 2.

With the pneumatic tire of the present technology, the closed sipe 5 described above is preferably disposed so as to be dispersed throughout an entire surface of the land portion 3 formed in the tread surface 1. In this case, from the perspectives of uniformly maintaining a rigidity distribution of the land portion 3 and suppressing uneven wear, the closed sipe 5 is preferably disposed so that the cuts 4 that form the closed sipe 5 are not near each other.

Figure 4:
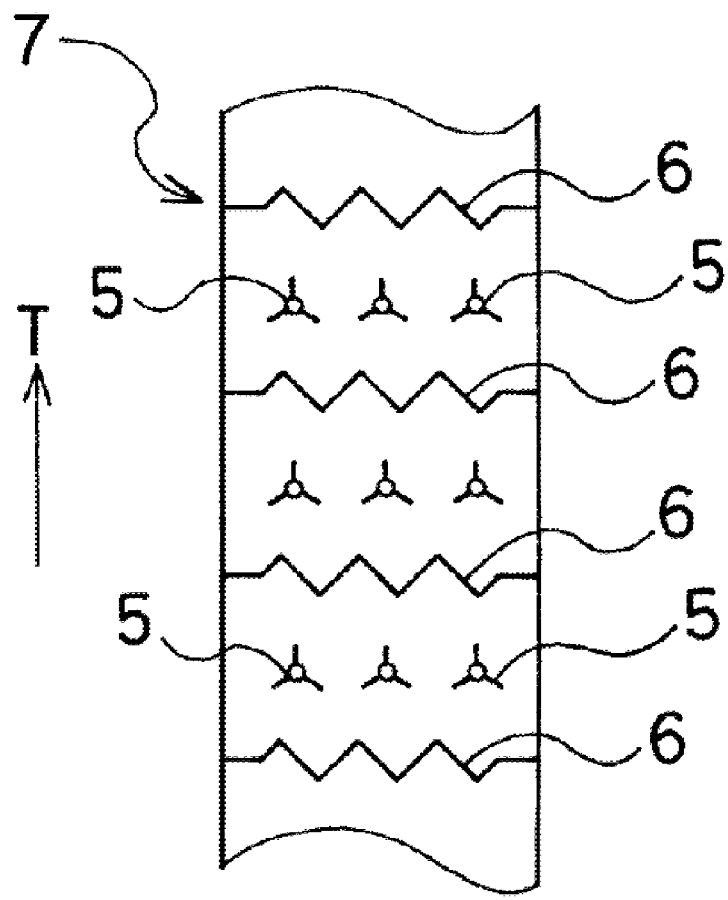
FIG. 4 is a plan view illustrating a portion of a tread surface of a pneumatic tire according to an embodiment of the present technology.
Figure 5:
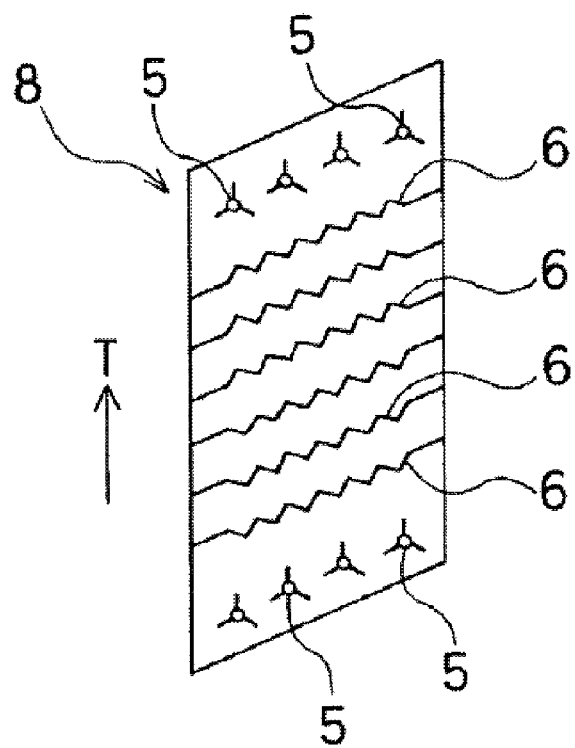
FIG. 5 is a plan view illustrating a portion of a tread surface of a pneumatic tire according to another embodiment of the present technology.

Furthermore, depending on the characteristics desired for the tire, as illustrated in FIGS. 4 and 5, the closed sipe 5 can be disposed in the tread surface 1 in combination with a sipe 6 extending in the tire width direction. As a result, the edge effects accompanying the disposal of the sipe 6 are increased, and a high degree of both steering stability and braking performance on ice can be achieved. Note that in this embodiment, both ends in the extending direction of the sipe 6 are open to a side surface in the tire width direction of a rib 7, but this should not be construed to mean that non-open sipes are excluded.

In FIG. 4, an example is illustrated in which a plurality of the closed sipe 5 is disposed in parallel in a surface of the rib 7 formed in the tread surface 1 and the sipes 6, having a zigzag shape extending in the tire width direction, are disposed alternately in a tire circumferential direction T. However, the form of the sipe 6 and the arrangement thereof are not limited thereto, and can be arbitrarily modified depending on the form of the tread pattern. Examples of the form of the sipe 6 include substantially linear or wavelike forms, forms that constitute three-dimensional forms, and the like.

Additionally, when forming a block 8 in the tread surface 1, as illustrated in FIG. 5, the block 8 is partitioned by the sipe 6 that extends in the tire width direction. The closed sipe 5 is preferably disposed in parallel in a tire width direction along at least one side of front/back edges (corresponding to a trailing edge side and/or a leading edge side of the tire) of the block 8.

Particularly, to an extent possible, the sipe 6 extending in the tire width direction is not formed in regions of the leading edge and/or the trailing edge corresponding to about 30% or less of a length of the block 8 in the tire-circumferential direction. Rather, the closed sipe 5 of the present technology is preferably disposed in parallel along the tire width direction. As a result, block rigidity in the leading edge and/or the trailing edge of the block 8 can be ensured, steering stability can be enhanced while efficiently suppressing uneven wear, water absorption can be enhanced, and braking performance on ice can be enhanced.

As described above, the pneumatic tire of the present technology includes a closed sipe that is formed in a tread surface and includes a small hole extending in a tire radial direction and a plurality of cuts extending in a radiation direction from the small hole and terminating in a land portion. The cuts are provided with a twist in a depth direction centered on the small hole, and a twist angle from a top surface to a bottom surface of the land portion is not less than 10° and less than 135°. Therefore, braking performance when traveling on icy road surfaces can be enhanced while maintaining steering stability without hindering releasability from a mold. Thus, superior effects can be provided while realizing a simple construction and, therefore, the pneumatic tire of the present technology can be advantageously applied to a studless tire that requires braking performance on ice.

EXAMPLES

Figure 6:
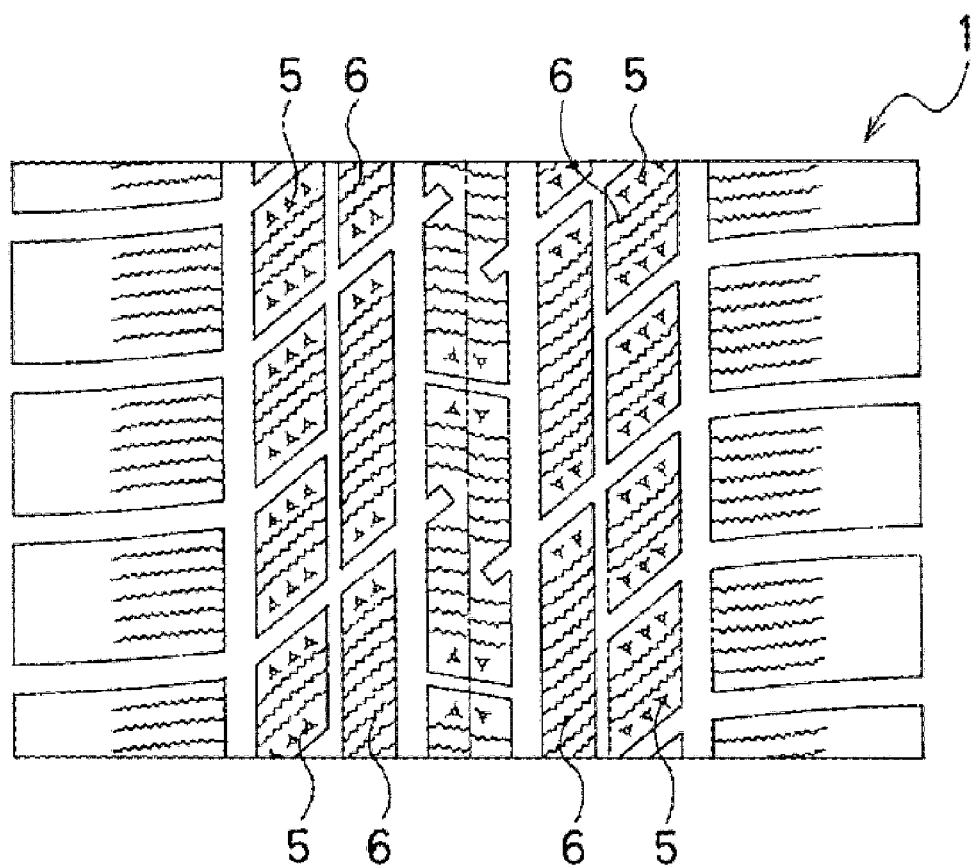
FIG. 6 is a partial plan view illustrating the tread surface of the pneumatic tire used in the working examples.

Tires of the present technology (Working Examples 1 to 8) and comparison tires (Comparative Examples 1 to 4) were fabricated having a tire size of 195/65R15 91Q and the tire pattern illustrated in FIG. 6. Note that in FIG. 6, an example is illustrated in which three of the cuts 4 of the closed sipe 5 are provided.

In the Working Examples, the closed sipe 5 had a form wherein the cuts 4 extend in a radiation direction from a center axis that extends in the tire radial direction, and terminate in the land portion; and the small hole 2 was formed on the center axis. Each of the closed sipes 5 had a common depth of 7 mm and each of the cuts 4 had a common thickness w of 0.5 mm. Tires of Working Examples 1 to 8 and Comparative Examples 1 and 2 were fabricated wherein the number of cuts 4, the twist angle of the cuts 4, the diameter d of the inscribed circle of the small hole 2, d/w, the presence of the sipe 6 extending in the tire width direction, and whether the closed sipe 5 is disposed on the leading edge side and the trailing edge side of the block were varied according to the configurations shown in Table 1 in FIGS. 7A and 7B.

Additionally, tires of Comparative Examples 3 and 4 were fabricated as follows. That is, the closed sipe 5 was obtained by forming the cuts 4 that extend in a radiation direction from a center axis extending in the tire radial direction and that terminate in the land portion without forming the small hole 2 on the center axis. In particular, tires of Comparative Examples 3 and 4 were fabricated by varying the number of the cuts 4 and the twist angle of the cuts 4 according to the configurations shown in Table 1. Each of the closed sipes 5 had a common depth of 7 mm and each of the cuts 4 had a common thickness w of 0.5 mm.

Each of these 12 types of tires was evaluated for braking performance on ice according to the test method described below, and releasability when removing the tire from a mold after vulcanization was also evaluated. In evaluating the releasability when removing the tire from a mold after vulcanization, tires where the tread surface was not damaged were shown as "○" and tires where the tread surface was damaged were shown as "x" in Table 1.

Braking Performance on Ice Test

Each tire was assembled on a 15×6JJ rim, inflated to an air pressure of 230 kPa, and mounted on the front and back wheels of a passenger car (made in Japan) having an engine displacement of 2,000 cc. A braking test from an initial speed of 40 km/hr was performed on an icy road surface, and braking performance on ice was evaluated based on the inverse of the stopping distance following application of the brakes. The results were indexed and Comparative Example 1 was assigned an index value of 100. The results are shown in Table 1. A larger index value indicates superior braking performance on ice.

The tires of Working Examples 1 to 8 of the present technology have the small hole 2 formed on the center axis and are configured so as to have a twist angle θ with respect to the tire radial direction in a range of not less than 10° and less than 135°. It is clear from Table 1 that these tires of Working Examples 1 to 8, in comparison with the comparison tires (tires of Comparative Examples 1 to 4), have superior braking performance on ice and have excellent releasability from a mold. Particularly, it is clear that the tires of Working Examples 7 and 8, where from 3 to 6 cuts 4 were provided, and a ratio (d/w) of the diameter d of the inscribed circle of the small hole 2 to the thickness w of the cuts 4 was in a range of 1.5 to 20, had exceptionally superior braking performance on ice.

What is claimed is:

1. A pneumatic tire comprising:
   a closed sipe that is formed in a tread surface and includes a small hole extending in a tire radial direction and a plurality of cuts extending in a radiation direction from the small hole and terminating in a land portion; wherein
   a diameter of an inscribed circle of the small hole is greater than a thickness of the cuts,
   the cuts are provided with a twist in a depth direction centered on the small hole and connect to the small hole from the tread surface to a bottom of the cuts, and
   a twist angle of the plurality of cuts from a top surface to a bottom surface of the land portion is from 10° to 120°.

2. The pneumatic tire according to claim 1, wherein from 3 to 6 of the cuts are provided.

3. The pneumatic tire according to claim 1, wherein a diameter of the inscribed circle of the small hole is configured so as to be from 1.5 to 20 times the thickness of the cuts.

4. The pneumatic tire according to claim 1, wherein the closed sipe is disposed in the tread surface in combination with a sipe extending in a tire width direction.

5. The pneumatic tire according to claim 4, wherein the closed sipe is disposed along the tire width direction on a leading edge side and/or a trailing edge side of a block formed in the tread surface.

6. The pneumatic tire according to claim 1, wherein the twist angle of the plurality of cuts from the top surface to the bottom surface of the land portion is from 90° to 120°.

7. The pneumatic tire according to claim 1, wherein the twist angle varies between cuts.

8. The pneumatic tire according to claim 1, wherein spacing between mutually adjacent cuts in a single closed sipe is varied.

9. The pneumatic tire according to claim 1, wherein the twist angle varies linearly with respect to a depth direction.

10. The pneumatic tire according to claim 1, wherein the twist angle varies non-linearly with respect to a depth direction.

11. The pneumatic tire according to claim 1, wherein 4 of the cuts are provided.

12. The pneumatic tire according to claim 1, wherein a cross-sectional shape of the small hole positioned in the center portion of the closed sipe is configured to have a substantially round shape or a rectangular shape.

13. The pneumatic tire according to claim 1, wherein a cross-sectional shape of the small hole positioned in the center portion of the closed sipe is configured so as to form a polygonal or star shape that corresponds to the number of the cuts.

14. The pneumatic tire according to claim 1, wherein a diameter d of an inscribed circle of the small hole is configured so as to be a size from 1.5 to 5 times of a thickness of the cuts.

15. The pneumatic tire according to claim 1, wherein a thickness of the cuts is set from about 0.5 to 2 mm.

16. The pneumatic tire according to claim 1, wherein the tire is provided with a platform which acts as an indication of specification limits as a winter tire and a depth of the closed sipe is set so as to reach a top surface of the platform.

17. The pneumatic tire according to claim 1, wherein the cuts extend in a linear form in the radiation direction from the small hole.

18. The pneumatic tire according to claim 1, wherein the closed sipe is formed so that a planar shape of the cuts extends in a wavelike or zigzag manner in the radiation direction from the small hole.

19. The pneumatic tire according to claim 1, wherein the closed sipe extending in the tire width direction is not formed in regions of the leading edge and/or the trailing edge corresponding to about 30% or less of a length of the block in the tire-circumferential direction.

20. The pneumatic tire according to claim 1, wherein the closed sipe is disposed in parallel along the tire width direction.

\* \* \* \* \*